US012723731B2

(12) United States Patent
Ueno

(10) Patent No.: US 12,723,731 B2
(45) Date of Patent: Sep. 1, 2026

(54) VEHICLE LIGHTING DEVICE AND VEHICLE LAMP

(71) Applicant: Toshiba Lighting & Technology Corporation, Kanagawa (JP)

(72) Inventor: Misaki Ueno, Ehime-ken (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 0 days.

(21) Appl. No.: 19/266,093

(22) Filed: Jul. 10, 2025

(65) Prior Publication Data

US 2026/0071733 A1 Mar. 12, 2026

(30) Foreign Application Priority Data

Sep. 11, 2024 (JP) ................................ 2024-157386

(51) Int. Cl.
*F21S 43/31* (2018.01)
*F21S 43/19* (2018.01)

(52) U.S. Cl.
CPC ........... *F21S 43/315* (2018.01); *F21S 43/195* (2018.01)

(58) Field of Classification Search
CPC ........ F21S 43/315; F21S 43/195; F21S 43/31; F21S 43/20; F21S 43/2605; F21S 43/2621; F21S 43/26261; F21S 43/2641; F21S 43/26421; F21V 5/00; F21V 5/04; F21V 5/045; F21V 5/046
See application file for complete search history.

(56) References Cited

U.S. PATENT DOCUMENTS

| | | | | |
|---|---|---|---|---|
| 10,344,940 B2 * | 7/2019 | Gloss | ........................ | B60Q 1/20 |
| 2009/0290371 A1 * | 11/2009 | Yagi | ...................... | F21S 41/143 362/518 |
| 2019/0041022 A1 | 2/2019 | Gloss et al. | | |

FOREIGN PATENT DOCUMENTS

| | | |
|---|---|---|
| CN | 110887015 | 3/2020 |
| CN | 212252466 | 12/2020 |
| CN | 114636135 | 6/2022 |
| JP | 2011171277 | 9/2011 |
| JP | 2014038731 | 2/2014 |
| JP | 2014060047 | 4/2014 |
| JP | 2016015263 | 1/2016 |
| JP | 2016100087 | 5/2016 |
| JP | 2019192471 | 10/2019 |
| JP | 6606385 | 11/2019 |
| WO | 2018011014 | 1/2018 |

* cited by examiner

*Primary Examiner* — Bao Q Truong
(74) *Attorney, Agent, or Firm* — JCIPRNET

(57) ABSTRACT

A vehicle lighting device according to an embodiment includes: a socket; a light emitting module provided on one end side of the socket and including at least one light emitting element; and an optical element provided on the one end side of the socket and facing the light emitting element. The optical element has at least one incident surface having a convex curved surface protruding toward the light emitting element side; and an exit surface facing the incident surface and provided with multiple lens portions arranged side by side. The convex curved surface is a paraboloid of revolution or a hyperboloid of revolution. A luminous intensity distribution in a first direction, orthogonal to a central axis of the vehicle lighting device, of light exiting from the exit surface differs from a luminous intensity distribution in a second direction orthogonal to the central axis and the first direction.

5 Claims, 6 Drawing Sheets

VEHICLE LIGHTING DEVICE AND VEHICLE LAMP

CROSS-REFERENCE TO RELATED APPLICATION

This application claims the priority benefit of Japanese application serial no. 2024-157386, filed on Sep. 11, 2024. The entirety of the above-mentioned patent application is hereby incorporated by reference herein and made a part of this specification.

TECHNICAL FIELD

Embodiments of the disclosure relate to a vehicle lighting device and a vehicle lamp.

BACKGROUND

From the viewpoints of energy saving and long service life, vehicle lighting devices including light emitting elements such as light emitting diodes are becoming widespread, replacing vehicle lighting devices including lamps that have filaments. Such vehicle lighting devices include a socket, and a light emitting module that is provided on one end side of the socket and has a light emitting element.

Here, vehicle lighting devices may require different light distribution characteristics depending on the applications of the vehicle lighting devices. For example, in the case of a rear fog lamp, the required light distribution characteristics are that the light irradiation angle of the luminous intensity distribution of the vehicle lighting device in the horizontal direction is larger than the light irradiation angle of the luminous intensity distribution in the vertical direction (direction perpendicular to the horizontal direction). Such light distribution characteristics having a luminous intensity distribution that is asymmetric in the horizontal direction and the vertical direction can be obtained, for example, by changing the arrangement and number of light emitting elements provided in the light emitting module. For example, light distribution characteristics having a luminous intensity distribution that is asymmetric in the horizontal direction and the vertical direction can be obtained by changing the distance between the optical axis of the vehicle lighting device and the center of the light emitting element in the horizontal direction and the vertical direction, or by changing the number of light emitting elements.

However, in this case, for example, it is necessary to change the arrangement and number of multiple light emitting elements for each application of the vehicle lighting device, which may consequently complicate the inventory management of vehicle lighting devices and increase the manufacturing cost of vehicle lighting devices.

Therefore, it has been desired to develop a technology which can obtain light distribution characteristics having a luminous intensity distribution that is asymmetric in the horizontal direction and the vertical direction.

RELATED ART DOCUMENTS

Patent Documents

[Patent Document 1] Japanese Patent Application Laid-Open No. 2011-171277

The disclosure provides a vehicle lighting device and a vehicle lamp that are capable of obtaining light distribution characteristics having a luminous intensity distribution that is asymmetric in the horizontal direction and the vertical direction.

SUMMARY

A vehicle lighting device according to an embodiment includes: a socket; a light emitting module provided on one end side of the socket and including at least one light emitting element; and an optical element provided on the one end side of the socket and facing the light emitting element. The optical element has: at least one incident surface having a convex curved surface protruding toward a light emitting element side; and an exit surface facing the incident surface and provided with a plurality of lens portions arranged side by side. The convex curved surface is a paraboloid of revolution or a hyperboloid of revolution. A luminous intensity distribution in a first direction, orthogonal to a central axis of the vehicle lighting device, of light exiting from the exit surface differs from a luminous intensity distribution in a second direction orthogonal to the central axis and the first direction.

According to the embodiments of the disclosure, it is possible to provide a vehicle lighting device and a vehicle lamp that are capable of obtaining light distribution characteristics having a luminous intensity distribution that is asymmetric in the horizontal direction and the vertical direction.

DESCRIPTION OF THE EMBODIMENTS

Figure 1:
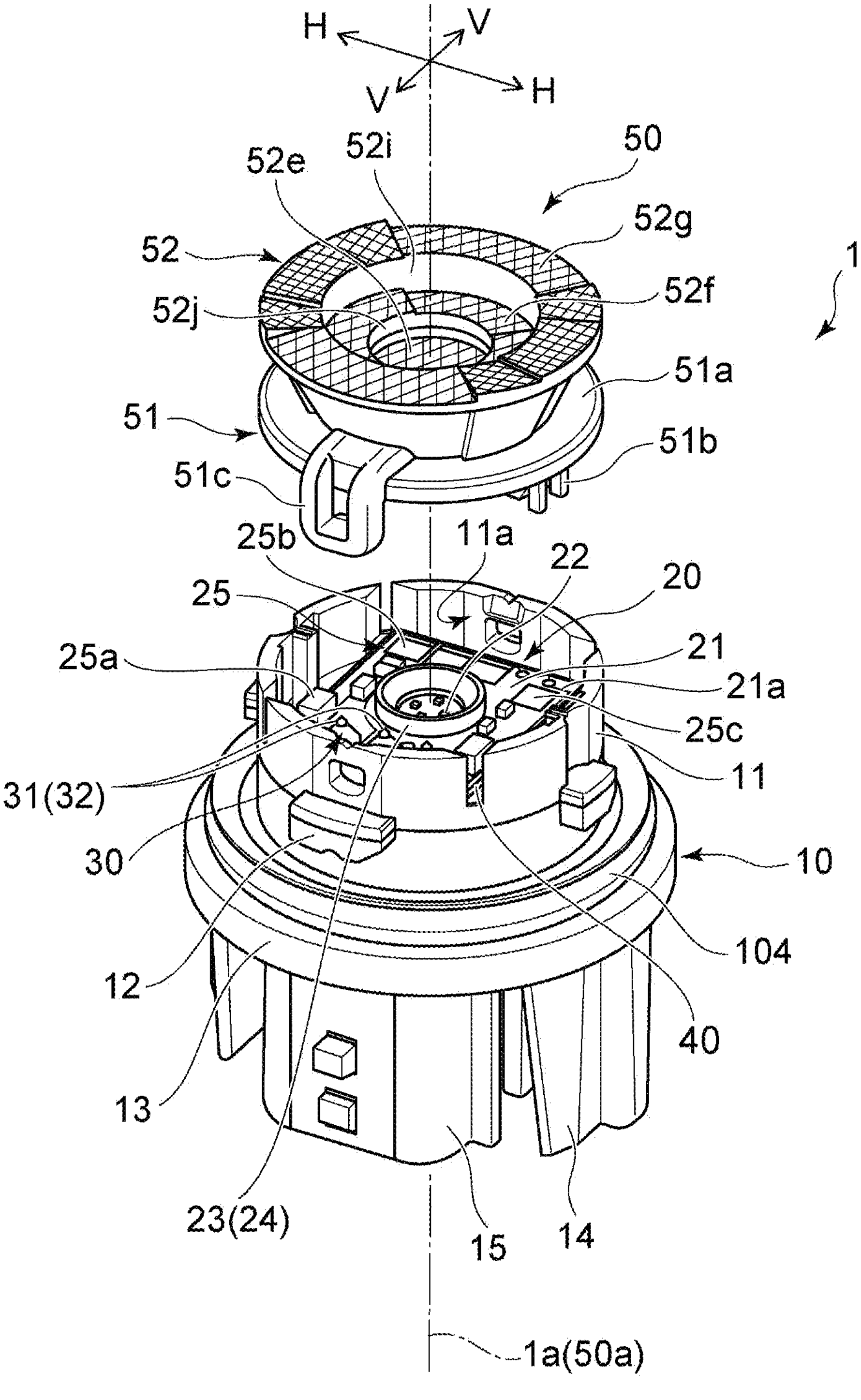
FIG. 1 is a schematic exploded view for illustrating the vehicle lighting device according to this embodiment.

Hereinafter, embodiments will be illustrated with reference to the drawings. In each drawing, similar components are denoted by the same reference numerals, and detailed descriptions will be omitted where appropriate.

(Vehicle Lighting Device)

A vehicle lighting device 1 according to this embodiment can be provided in, for example, automobiles, railway vehicles, and the like. The vehicle lighting device 1 can be used for a lamp that requires light distribution characteristics having a luminous intensity distribution in which the light irradiation angles of the luminous intensity distribution differ between the horizontal direction and the vertical direction (direction perpendicular to the horizontal direction) (asymmetric luminous intensity distribution), such as a rear fog lamp. However, the application of the vehicle lighting device 1 is not limited to a rear fog lamp.

FIG. 1 is a schematic exploded view for illustrating the vehicle lighting device 1 according to this embodiment.

As shown in FIG. 1, the vehicle lighting device 1 includes, for example, a socket 10, a light emitting module 20, a power supply portion 30, a heat transfer portion 40, and an optical portion 50.

The socket 10 includes, for example, a mounting portion 11, a bayonet 12, a flange 13, a heat dissipation fin 14, and a connector holder 15.

The mounting portion 11 is provided on a surface of the flange 13 opposite to the side where the heat dissipation fin 14 is provided. The external shape of the mounting portion 11 is, for example, columnar. The mounting portion 11 has, for example, a recess 11*a* that opens at an end opposite to the flange 13 side.

The bayonet 12 is provided, for example, on a side surface of the mounting portion 11. The bayonet 12 protrudes toward the outer side of the vehicle lighting device 1. The bayonet 12 faces the flange 13. Multiple bayonets 12 can be provided. The bayonet 12 is used when mounting the vehicle lighting device 1 to, for example, a housing 101 of a vehicle lamp 100 described later. The bayonet 12 can be used for a twist lock.

The flange 13 presents, for example, a substantially disc shape. A side surface of the flange 13 is positioned more outward of the vehicle lighting device 1 than a side surface of the bayonet 12.

The heat dissipation fin 14 is provided on a side of the flange 13 opposite to the mounting portion 11 side. At least one heat dissipation fin 14 can be provided. For example, as shown in FIG. 1, multiple heat dissipation fins 14 can be provided on the socket 10. The multiple heat dissipation fins 14 can be provided and arranged side by side in a predetermined direction. The heat dissipation fin 14 presents, for example, a plate shape or a cylindrical shape.

The connector holder 15 is provided on a side of the flange 13 opposite to the mounting portion 11 side. The connector holder 15 can be provided and arranged side by side with the heat dissipation fin 14. The connector holder 15 presents a cylindrical shape, and a connector 105 having a sealing member 105*a* inside is inserted therein.

The socket 10 has a function of holding the light emitting module 20, the power supply portion 30, and the optical portion 50, and a function of transmitting heat generated in the light emitting module 20 to the outside. Therefore, the socket 10 is preferably made of a material having high thermal conductivity. The socket 10 can be made of, for example, a metal such as aluminum alloy.

The socket 10 can also be made of, for example, a high thermal conductivity resin. The high thermal conductivity resin is, for example, a resin such as PET (Polyethylene terephthalate) or Nylon (Nylon) mixed with a filler using carbon or aluminum oxide. In the case of the socket 10 including a high thermal conductivity resin, heat generated in the light emitting module 20 can be efficiently dissipated. In addition, the weight of the socket 10 can be reduced.

The light emitting module 20 is provided on one end side of the socket 10.

As shown in FIG. 1, the light emitting module 20 includes, for example, a substrate 21, a light emitting element 22, a frame portion 23, a sealing portion 24, and a circuit element 25.

The substrate 21 is bonded on, for example, the heat transfer portion 40. As described later, the heat transfer portion 40 may be omitted. In the case of the heat transfer portion 40 being omitted, for example, the substrate 21 is bonded to the bottom surface of the recess 11*a*. The adhesive for bonding the substrate 21 is preferably an adhesive having high thermal conductivity. For example, the adhesive can be an adhesive mixed with a filler using a conductive material or an inorganic material.

The substrate 21 presents a plate shape. The planar shape of the substrate 21 (the shape as viewed from the direction along a central axis 1*a* of the vehicle lighting device 1) is, for example, substantially rectangular. The substrate 21 can be made of, for example, an inorganic material such as ceramics (for example, aluminum oxide or aluminum nitride), an organic material such as paper phenolic or glass epoxy, or the like. Further, the substrate 21 may be a metal core substrate having a surface of a metal plate covered with an insulating material. Also, the substrate 21 may have a single layer structure or may have a multilayer structure.

Furthermore, a wiring pattern 21*a* is provided on the surface of the substrate 21.

A covering portion that covers the wiring pattern 21*a* and a film-like resistor described later can also be provided. The covering portion can include, for example, a glass material.

The light emitting element 22 is provided on the substrate 21 (on the surface of the substrate 21 opposite to the socket 10 side). The light emitting element 22 is electrically connected to the wiring pattern 21*a*. At least one light emitting element 22 can be provided. The light emitting module 20 illustrated in FIG. 1 is provided with four light emitting elements 22. Multiple light emitting elements 22 can be connected in series.

In the case where one light emitting element 22 is provided, the one light emitting element 22 can be provided at the position of the central axis 1*a* of the vehicle lighting device 1. In the case where multiple light emitting elements 22 are provided, the multiple light emitting elements 22 can be provided at rotationally symmetric positions on a circumference centered on the central axis 1*a* of the vehicle lighting device 1.

Arranging the light emitting elements 22 in this manner makes it possible to obtain light distribution characteristics having a luminous intensity distribution (symmetric luminous intensity distribution) in which the light irradiation angles of the luminous intensity distribution are substantially the same in the horizontal direction H-H (corresponding to an example of the second direction) and the vertical direction V-V (corresponding to an example of the first direction). Therefore, the versatility of the light emitting module 20 can be improved. The improved versatility of the light emitting module 20 facilitates the inventory management of the light emitting module 20, and can reduce the manufacturing cost of the light emitting module 20.

The horizontal direction H-H and the vertical direction V-V in this specification are directions at the time when mounting the vehicle lighting device 1 to the housing 101 of the vehicle lamp 100. In this case, the horizontal direction H-H and the vertical direction V-V may include not only the complete horizontal direction H-H and the complete vertical direction V-V, but also errors caused by manufacturing errors or attaching errors of the vehicle lighting device 1 or the optical portion 50. That is to say, the horizontal direction H-H may be slightly deviated from the complete horizontal direction H-H. The vertical direction V-V may be slightly deviated from the complete vertical direction V-V.

The light emitting element 22 can be, for example, a light emitting diode, an organic light emitting diode, a laser diode, or the like.

The light emitting element 22 can be a chip-type light emitting element, a surface-mount type light emitting element such as a PLCC (Plastic Leaded Chip Carrier) type, or a light emitting element having lead wires such as a bullet type. The light emitting element 22 illustrated in FIG. 1 is a chip-type light emitting element. In this case, a chip-type light emitting element is preferable considering miniaturization of the light emitting module 20 and consequently miniaturization of the vehicle lighting device 1. In the following, a case in which the light emitting element 22 is a chip-type light emitting element will be described as an example.

The chip-type light emitting element 22 can be mounted on the wiring pattern 21*a* by COB (Chip On Board). The chip-type light emitting element 22 may be any of an upper electrode type light emitting element, an upper and lower electrode type light emitting element, or a flip chip type light emitting element.

The frame portion 23 is provided on the substrate 21. The frame portion 23 is adhered to the substrate 21. The frame portion 23 presents a frame shape and surrounds the light emitting element 22. The frame portion 23 has, for example, a function of defining a formation range of the sealing portion 24, and a function of a reflector. The frame portion 23 can also be omitted. In the case of the frame portion 23 being omitted, for example, a dome-shaped sealing portion 24 is provided on the substrate 21. The contour of the planar shape of the frame portion 23 is, for example, a circle.

The sealing portion 24 is provided on the inner side of the frame portion 23. The sealing portion 24 is provided to cover a region surrounded by the frame portion 23. The sealing portion 24 is provided to cover the light emitting element 22. The sealing portion 24 includes a resin having light transmissivity. The resin is, for example, silicone resin or the like. The sealing portion 24 can also include a phosphor.

In the case of the light emitting element 22 being a surface-mount type light emitting element or a light emitting element having lead wires such as a bullet type, the frame portion 23 and the sealing portion 24 can be omitted.

The circuit element 25 can be a passive element or an active element used to configure a light emitting circuit having the light emitting element 22. The circuit element 25 is provided on the substrate 21. The circuit element 25 is provided, for example, around the frame portion 23 and is electrically connected to the wiring pattern 21*a*.

The circuit element 25 illustrated in FIG. 1 is a protection element 25*a*, a resistor 25*b*, and a control element 25*c*.

However, the circuit element 25 is not limited to the types illustrated, and can be appropriately changed according to the configuration of the light emitting circuit having the light emitting element 22. For example, besides the types described above, the circuit element 25 may be a capacitor, a positive temperature coefficient thermistor, a negative temperature coefficient thermistor, an inductor, a surge absorber, a varistor, a transistor, an integrated circuit, an arithmetic element, or the like.

The protection element 25*a* is provided, for example, to prevent a reverse voltage from being applied to the light emitting element 22 and to prevent pulse noise from the reverse direction from being applied to the light emitting element 22. The protection element 25*a* can be, for example, a diode.

The resistor 25*b* can be, for example, a surface-mount type resistor, a resistor having lead wires (metal oxide film resistor), a film-like resistor formed using a screen printing method, or the like. The resistor 25*b* illustrated in FIG. 1 is a film-like resistor. The resistor 25*b* is provided, for example, to adjust variations in the forward voltage characteristics of the light emitting element 22.

The control element 25*c* is provided, for example, to switch the voltage applied to the light emitting element 22 or to execute temperature derating. However, the control element 25*c* is not limited to the function and application illustrated. The control element 25*c* can be, for example, a transistor or an integrated circuit. The control element 25*c* illustrated in FIG. 1 is a surface-mount type integrated circuit.

The power supply portion 30 includes, for example, multiple power supply terminals 31 and a holding portion 32.

The multiple power supply terminals 31 each present a rod shape, and one end thereof protrudes from the bottom surface of the recess 11*a*. One end of each of the multiple power supply terminals 31 is soldered to the wiring pattern 21*a* provided on the substrate 21. The other end of each of the multiple power supply terminals 31 is exposed inside the hole of the connector holder 15. The connector 105 is fitted to the multiple power supply terminals 31 exposed inside the holes of the connector holder 15. The multiple power supply terminals 31 are made of a metal such as copper alloy.

In the case of the socket 10 being formed using, for example, a high thermal conductivity resin including a filler using carbon, or a metal, the socket 10 becomes conductive. Therefore, the holding portion 32 is provided to insulate between the multiple power supply terminals 31 and the conductive socket 10. In the case of the socket 10 being formed using an insulating high thermal conductivity resin (for example, a high thermal conductivity resin including a filler using aluminum oxide, or the like), the holding portion 32 can be omitted. The holding portion 32 can be, for example, press-fitted into hole provided in the socket 10 or adhered to the inner wall of the hole.

The heat transfer portion 40 presents a plate shape and is provided between the socket 10 and the light emitting module 20 (substrate 21). The heat transfer portion 40 is made of a material having high thermal conductivity. For example, the heat transfer portion 40 is made of a metal such as aluminum, aluminum alloy, copper, and copper alloy. In the case of the socket 10 being made of a metal or in the case of little heat being generated in the light emitting module 20, the heat transfer portion 40 can also be omitted.

Here, as described above, in the case of the light emitting module 20 having light distribution characteristics having a luminous intensity distribution (symmetric luminous intensity distribution) in which the light irradiation angles of the luminous intensity distribution are substantially the same in the horizontal direction H-H and the vertical direction V-V, the versatility of the light emitting module 20 can be improved. However, depending on the application of the vehicle lighting device 1, the light distribution characteristics required may have a luminous intensity distribution (asymmetric luminous intensity distribution) in which the light irradiation angle of the luminous intensity distribution in the horizontal direction H-H is wider than the light irradiation angle of the luminous intensity distribution in the vertical direction V-V.

Therefore, the vehicle lighting device 1 is provided with the optical portion 50 (optical element 52) that converts the light distribution characteristics having symmetric luminous intensity distribution of the light emitting module 20 into light distribution characteristics having asymmetric luminous intensity distribution.

Figure 2:
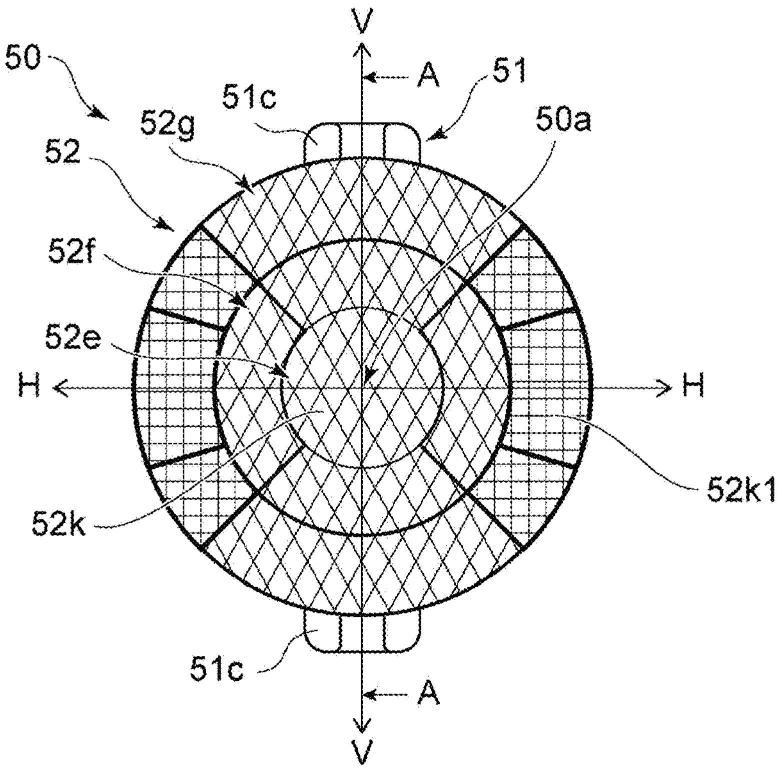
FIG. 2 is a schematic plan view of the optical portion.

FIG. 2 is a schematic plan view of the optical portion 50.

FIG. 2 is a schematic plan view in the case of viewing the optical portion 50 from a direction along the central axis 1*a* of the vehicle lighting device 1.

Figure 3:
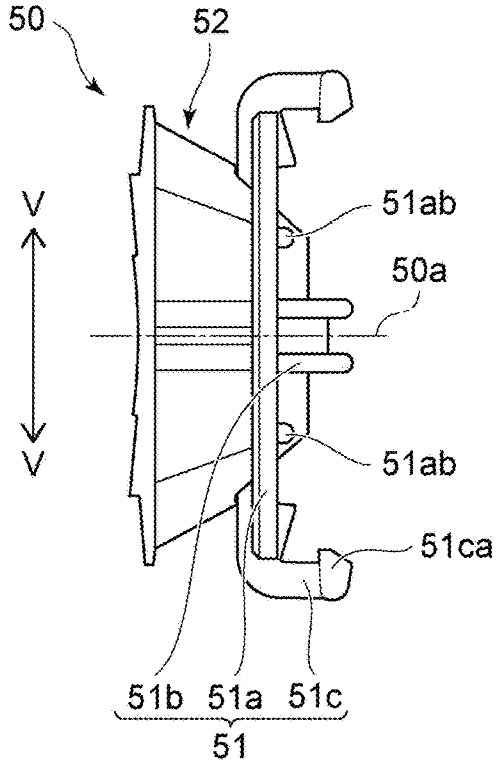
FIG. 3 is a schematic side view of the optical portion as viewed from the vertical direction.

FIG. 3 is a schematic side view in the case of viewing the optical portion 50 from the vertical direction V-V.

Figure 4:
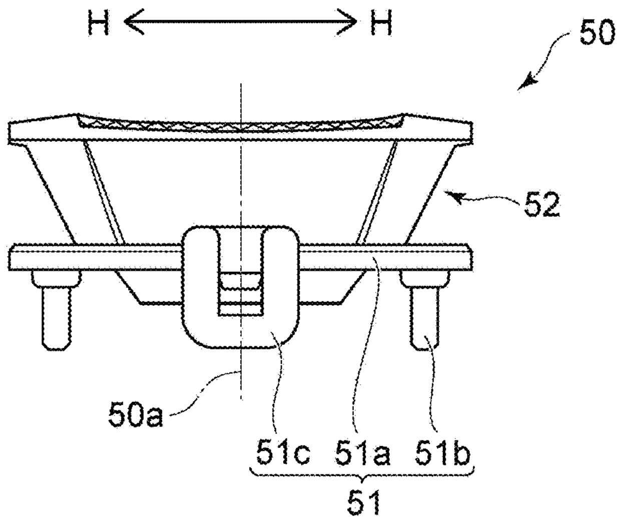
FIG. 4 is a schematic side view of the optical portion as viewed from the horizontal direction.

FIG. 4 is a schematic side view in the case of viewing the optical portion 50 from the horizontal direction H-H.

Figure 5:
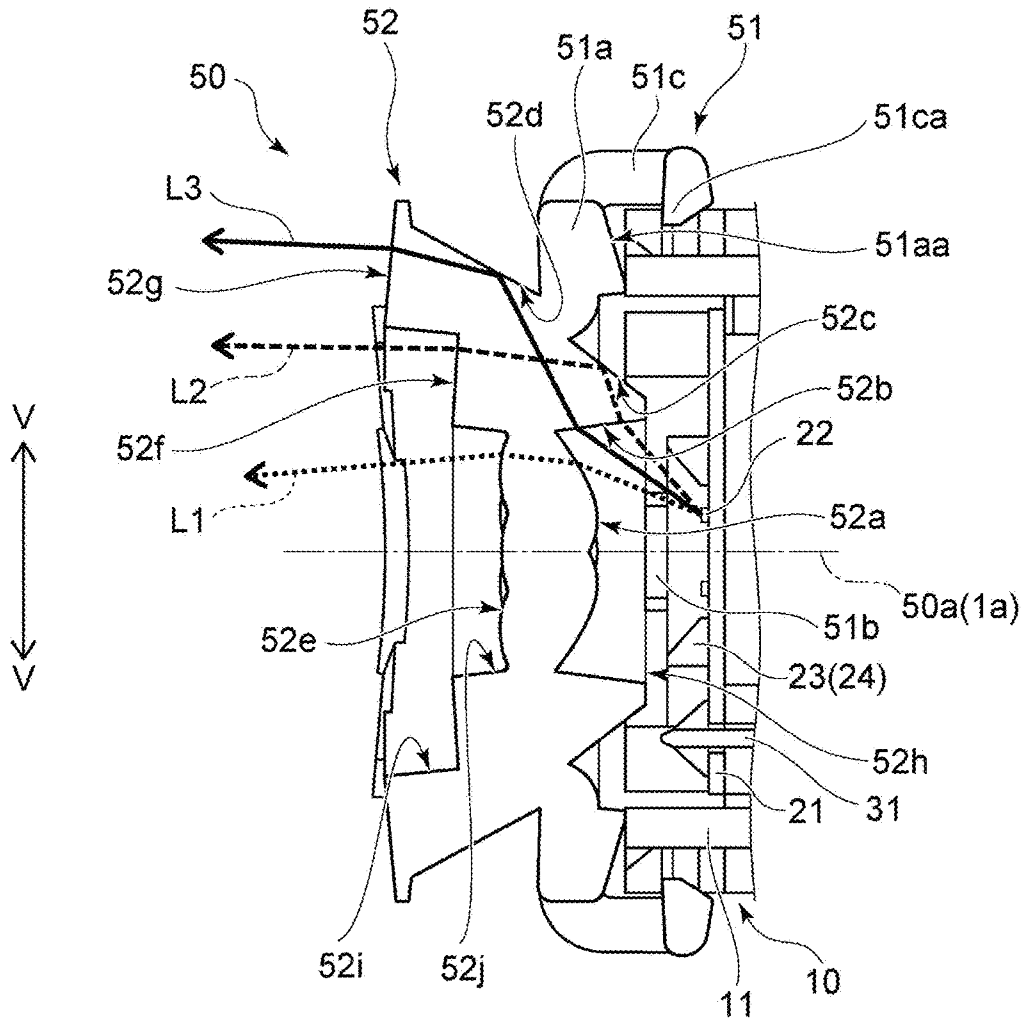
FIG. 5 is a schematic cross-sectional view of the optical portion in FIG. 2 taken along the A-A line direction.

FIG. 5 is a schematic cross-sectional view of the optical portion 50 in FIG. 2 taken along the A-A line direction.

As shown in FIG. 1 and FIG. 5, the optical portion 50 is, for example, detachably provided at the end of the socket 10 on the side where the light emitting module 20 is provided. For example, a central axis 50*a* of the optical portion 50 can be set to overlap with the central axis 1*a* of the vehicle lighting device 1. Further, for example, the central axis 50*a* of the optical portion 50 can be set to overlap with the central axis of an optical element 52 described later. In addition, as shown in FIG. 5, the optical portion 50 (flange 51*a*) can be provided, for example, to close the opening of the recess 11*a* of the mounting portion 11.

As shown in FIG. 1 to FIG. 5, the optical portion 50 includes, for example, an attaching portion 51 and the optical element 52.

The optical element 52 can be made of a material capable of transmitting light exiting from the light emitting module 20 (light emitting element 22). The optical element 52 is made of, for example, a translucent resin such as polycarbonate or acrylic, glass, or the like.

The material of the attaching portion 51 is not particularly limited as long as the attaching portion 51 has a certain degree of rigidity. For example, the attaching portion 51 can be made of a resin, a metal, or the like. The material of the attaching portion 51 may be the same as or different from the material of the optical element 52. In the case of the optical element 52 and the attaching portion 51 being made of the same material, for example, the optical element 52 and the attaching portion 51 can be integrally molded using an injection molding method. In the case of the optical element 52 and the attaching portion 51 being made of different materials, for example, the optical element 52 and the attaching portion 51 can be integrally molded using a two-color molding method or an insert molding method.

The attaching portion 51 includes, for example, a flange 51*a*, a support portion 51*b*, and a holding portion 51*c*.

The flange 51*a* presents, for example, a plate shape and is provided on a side surface of the optical element 52. The flange 51*a* extends from the side surface of the optical element 52 in the horizontal direction H-H and the vertical direction V-V. The flange 51*a* is provided, for example, in the vicinity of the end of the optical element 52 on the socket 10 (mounting portion 11) side. As shown in FIG. 5, a surface 51*aa* of the flange 51*a* on the socket 10 (mounting portion 11) side can be an inclined surface. The surface 51*aa* is inclined in a direction in which the thickness of the flange 51*a* gradually increases toward the center of the flange 51*a*.

Furthermore, as shown in FIG. 3, multiple protrusions 51*ab* can be provided on the surface 51*aa*. When mounting the optical portion 50 to the socket 10 (mounting portion 11), the multiple protrusions 51*ab* come into contact with an end of the socket 10 (mounting portion 11). Therefore, the position of the optical portion 50 in a direction along the central axis 1*a* of the vehicle lighting device 1 can be stabilized.

As shown in FIG. 4, the support portions 51*b* can be provided, for example, as a pair. The pair of support portions 51*b* can be arranged, for example, side by side in the horizontal direction H-H. When mounting the optical portion 50 to the socket 10 (mounting portion 11), the pair of support portions 51*b* are inserted into the recess 11*a* of the mounting portion 11. At this time, the outer surfaces of the support portions 51*b* come into contact with the inner wall of the recess 11*a*. Therefore, displacement of the position of the optical portion 50 in the horizontal direction H-H can be suppressed.

As shown in FIG. 3 and FIG. 5, the holding portions 51*c* can be provided, for example, as a pair. The pair of holding portions 51*c* can be arranged, for example, side by side in the vertical direction V-V. At the tip of the holding portion 51*c*, a claw 51*ca* protruding toward the center side of the flange 51*a* is provided. As shown in FIG. 5, when mounting the optical portion 50 to the socket 10 (mounting portion 11), the socket 10 (mounting portion 11) is inserted between the pair of holding portions 51*c*. At this time, the claw 51*ca* enters into the hole provided on the side surface of the mounting portion 11. Therefore, displacement of the position of the optical portion 50 in a direction along the central axis 1*a* of the vehicle lighting device 1 and the position in the vertical direction V-V can be suppressed.

The optical element 52 is provided on one end side of the socket 10 and controls light distribution characteristics of light emitted from the light emitting element 22. In this case, the optical element 52 makes the light irradiation angle of the luminous intensity distribution in the vertical direction V-V orthogonal to the central axis 1*a* of the vehicle lighting device 1 of light exiting from the optical element 52 differ from the light irradiation angle of the luminous intensity distribution in the horizontal direction H-H orthogonal to the central axis 1*a* and the vertical direction V-V. For example, the optical element 52 converts light distribution characteristics having a luminous intensity distribution (symmetric luminous intensity distribution) in which the light irradiation angles of the luminous intensity distribution in the horizontal direction H-H and the vertical direction V-V are substantially the same, into light distribution characteristics having a luminous intensity distribution (asymmetric luminous intensity distribution) in which the light irradiation angle of the luminous intensity distribution in the horizontal direction H-H is wider than the light irradiation angle of the luminous intensity distribution in the vertical direction V-V. For example, the optical element 52 converts light distribution characteristics (symmetric luminous intensity distribution) of the light emitting module 20 having versatility into light distribution characteristics (asymmetric luminous intensity distribution) suitable for a rear fog lamp or the like.

Figure 6:
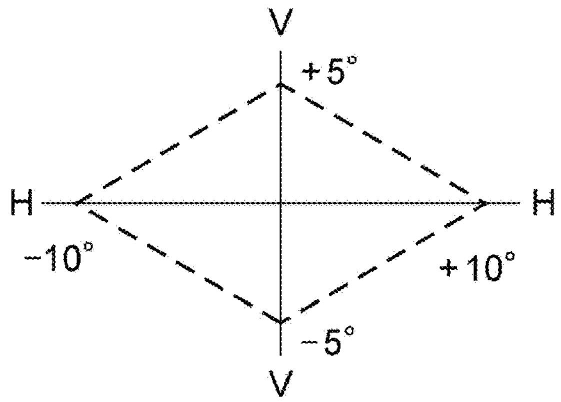
FIG. 6 is a diagram for illustrating an example of the light distribution characteristics of the optical element.

FIG. 6 is a diagram for illustrating an example of the light distribution characteristics of the optical element 52.

The angular positions of the rhombic region shown in FIG. 6 are light irradiation angles in which the horizontal direction H-H is between +10° to −10°, and the vertical direction V-V is between +5° to −5°. The minimum luminous intensity within the rhombic region is, for example, 75 cd (candela). The minimum luminous intensity on the axis in the horizontal direction H-H is, for example, 150 cd (candela). The minimum luminous intensity on the axis in the vertical direction V-V is, for example, 150 cd (candela). In addition, the luminous intensity in all directions is, for example, less than 300 cd (candela).

Such light distribution characteristics having a luminous intensity distribution (asymmetric luminous intensity distribution) in which the light irradiation angles differ between the horizontal direction H-H and the vertical direction V-V are suitable for light distribution characteristics of, for example, a rear fog lamp or the like.

As shown in FIG. 5, the optical element 52 is provided on one end side of the socket 10 and faces the light emitting element 22. The optical element 52 has, for example, an incident surface 52*a*, an incident surface 52*b*, a reflection surface 52*c*, a reflection surface 52*d*, an exit surface 52*e*, an exit surface 52*f*, and an exit surface 52*g*.

A recess 52*h* is provided at an end of the optical element 52 on the light emitting element 22 side, a bottom surface of the recess 52*h* serves as the incident surface 52*a*, and a side surface of the recess 52*h* serves as the incident surface 52*b*.

The incident surface 52*a* has a convex curved surface that protrudes toward the light emitting element 22 side. The incident surface 52*a* faces one light emitting element 22. Therefore, at least one incident surface 52*a* is provided.

Figure 7:
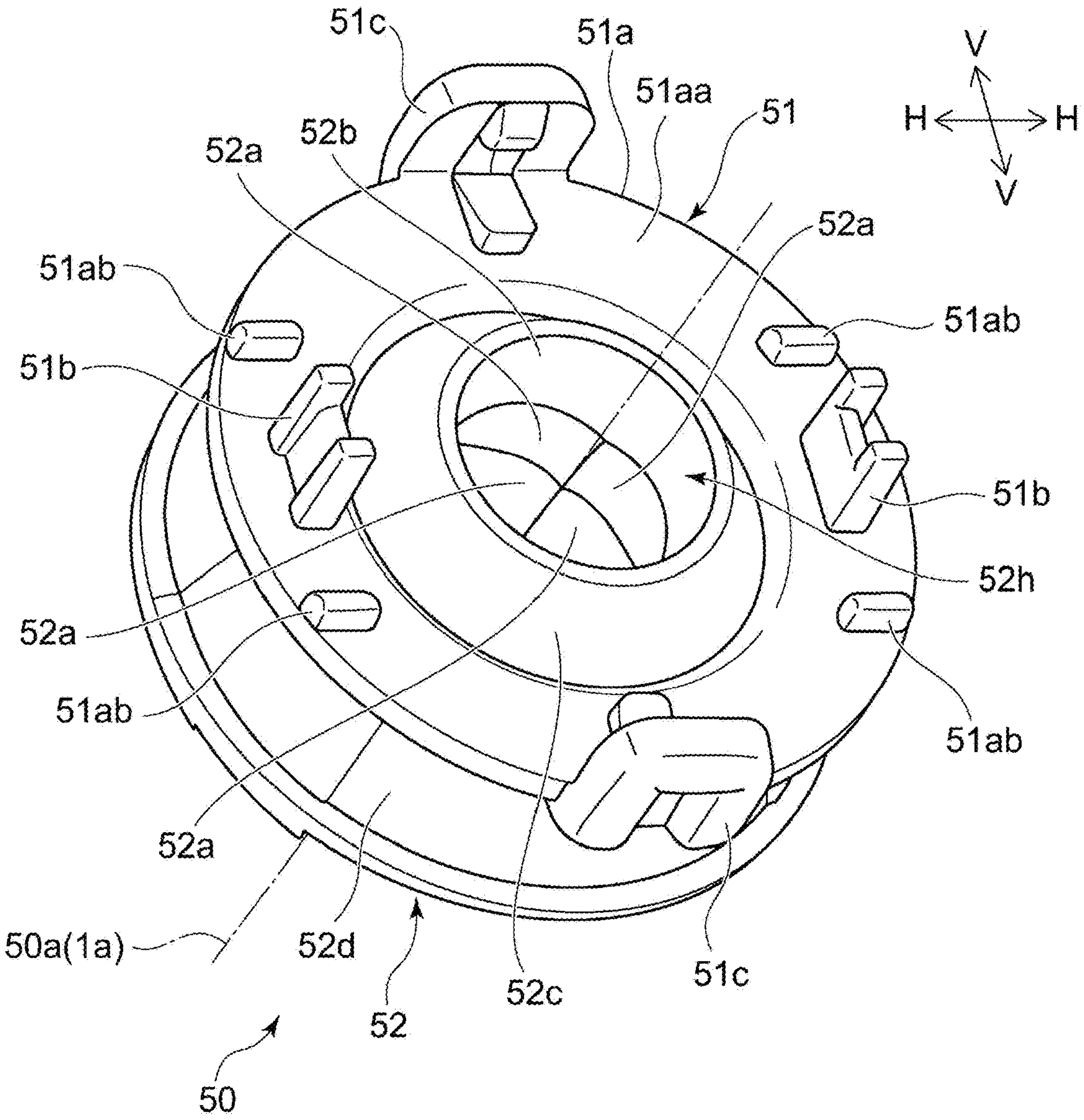
FIG. 7 is a schematic perspective view for illustrating the incident surface.

FIG. 7 is a schematic perspective view for illustrating the incident surface 52*a*.

As shown in FIG. 5 and FIG. 7, multiple incident surfaces 52*a* are provided in a region including the central axis of the optical element 52 (central axis 50*a* of the optical portion 50). The incident surface 52*a* is provided for each light emitting element 22. That is, the number of incident surfaces 52*a* can be the same as the number of light emitting elements 22.

For example, in the case of the optical element 52 illustrated in FIG. 5 and FIG. 7, the incident surface 52*a* is provided for each of the four light emitting elements 22. In this case, one incident surface 52*a* faces one light emitting element 22.

In the direction along the central axis 50*a* of the optical portion 50, the incident surface 52*a* is, for example, a convex curved surface that protrudes toward the light emitting element 22 side. In the case of viewing from the direction along the central axis 1*a* of the vehicle lighting device 1, the apex of the incident surface 52*a*, which is a convex curved surface, can be configured to overlap with the center of the light exit surface of the light emitting element 22, for example.

As shown in FIG. 5, the incident surface 52*b* is inclined with respect to the central axis 50*a* of the optical portion 50. In the direction along the central axis 50*a* of the optical portion 50, the incident surface 52*b* is inclined in a direction approaching the central axis 50*a* as the incident surface 52*b* extends away from the light emitting element 22. The incident surface 52*b* can be, for example, a curved surface like the side surface of a truncated cone.

The reflection surface 52*c* can be the outer surface in the vicinity of the end of the optical element 52 on the light emitting element 22 side. The reflection surface 52*c* is inclined with respect to the central axis 50*a* of the optical portion 50. In the direction along the central axis 50*a* of the optical portion 50, the reflection surface 52*c* is inclined in a direction separating from the central axis 50*a* as the reflection surface 52*c* extends away from the light emitting element 22. That is, the reflection surface 52*c* is inclined in the opposite direction to the incident surface 52*b*. The reflection surface 52*c* can be, for example, a curved surface like the side surface of a truncated cone.

The reflection surface 52*d* can be the outer surface in the vicinity of the end of the optical element 52 on the side opposite to the light emitting element 22 side. The reflection surface 52*d* is inclined with respect to the central axis 50*a* of the optical portion 50. In the direction along the central axis 50*a* of the optical portion 50, the reflection surface 52*d* is inclined in a direction separating from the central axis 50*a* as the reflection surface 52*d* extends away from the light emitting element 22. That is, the reflection surface 52*d* is inclined in the opposite direction to the incident surface 52*b*. The reflection surface 52*d* can be, for example, a curved surface like the side surface of a truncated cone.

As shown in FIG. 5, the attaching portion 51 (flange 51*a*) can be provided between the reflection surface 52*c* and the reflection surface 52*d*. Therefore, the reflection surface 52*c* and the reflection surface 52*d* can be discontinuous surfaces. Additionally, the inclination angle of the reflection surface 52*d* may be the same as or different from the inclination angle of the reflection surface 52*c*.

As shown in FIG. 1 and FIG. 5, a recess 52*i* is provided at the end of the optical element 52 on the side opposite to the light emitting element 22 side, and a recess 52*j* is provided on the bottom surface of the recess 52*i*. The end of the optical element 52 on the side opposite to the light emitting element 22 side serves as the exit surface 52*g*. The bottom surface of the recess 52*i* serves as the exit surface 52*f*. The bottom surface of the recess 52*j* serves as the exit surface 52*e*.

The exit surface 52*e* is provided in a region including the central axis 50*a* of the optical portion 50. In the case of viewing from the direction along the central axis 50*a* of the optical portion 50, the exit surface 52*e* can be provided at a position overlapping with the incident surface 52*a*. That is, the exit surface 52*e* faces the incident surface 52*a*, and multiple lens portions 52*k* described later are arranged side by side.

In the case of viewing from the direction along the central axis 50*a* of the optical portion 50, the exit surface 52*f* can be provided at a position overlapping with the reflection surface 52*c*.

In the case of viewing from the direction along the central axis 50*a* of the optical portion 50, the exit surface 52*g* can be provided at a position overlapping with the reflection surface 52*d*.

As shown in FIG. 1 and FIG. 2, the multiple lens portions 52*k* are arranged side by side on the light exit surfaces of the optical element 52 (exit surface 52*e*, exit surface 52*f*, and exit surface 52*g*). The exit surface 52*e*, the exit surface 52*f*, and the exit surface 52*g* can be, for example, lens arrays.

Figure 8A:
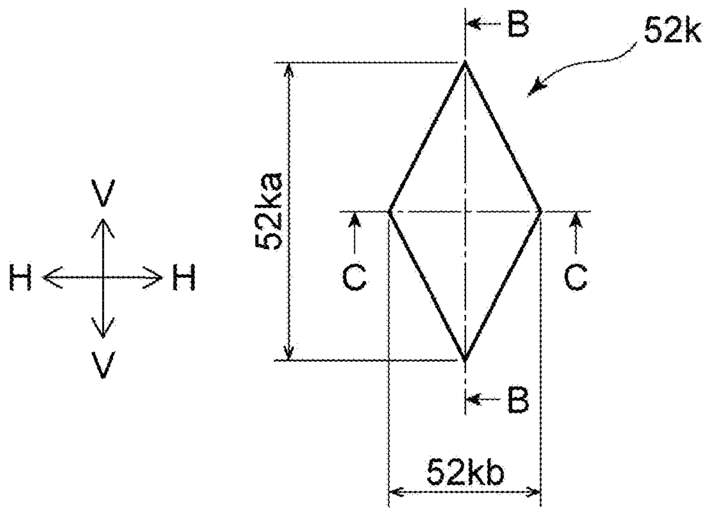
FIG. 8A to FIG. 8C are schematic diagrams for illustrating the lens portion provided on the exit surface.
Figure 8B:
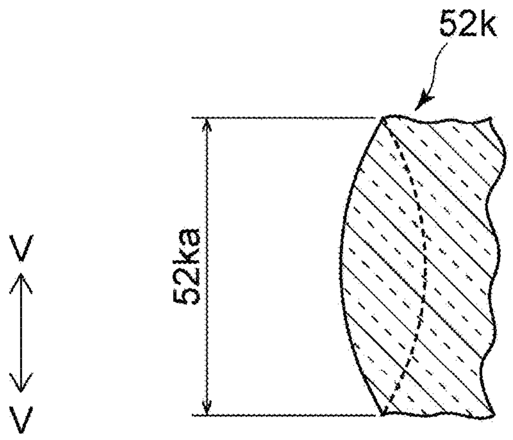
Figure 8C:
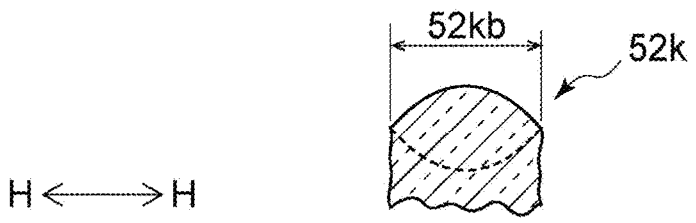

FIG. 8A to FIG. 8C are schematic diagrams for illustrating the lens portion 52*k* provided on the exit surface.

FIG. 8A is a schematic plan view for illustrating the lens portion 52*k* as viewed from the direction along the central axis 50*a* of the optical portion 50.

FIG. 8B is a schematic cross-sectional view of the lens portion 52*k* in FIG. 8A taken along the B-B line direction.

FIG. 8C is a schematic cross-sectional view of the lens portion 52*k* in FIG. 8A taken along the C-C line direction.

As shown in FIG. 8A, the shape of the lens portion 52*k* as viewed from the direction along the central axis 50*a* of the optical portion 50 can be substantially rhombic. For example, one diagonal line 52*ka* of the lens portion 52*k* can be parallel to the vertical direction V-V. For example, the other diagonal line 52*kb* of the lens portion 52*k* can be parallel to the horizontal direction H-H. In this case, the diagonal line 52*ka* can be longer than the diagonal line 52*kb*.

In the case of the diagonal line 52*ka* and the diagonal line 52*kb* having different lengths, as shown in FIG. 8B and FIG. 8C, the radius of curvature of the light exit surface of the lens portion 52*k* can be changed in the vertical direction V-V and the horizontal direction H-H. For example, the radius of curvature of the light exit surface of the lens portion 52*k* in the vertical direction V-V can be made larger than the radius of curvature of the light exit surface of the lens portion 52*k* in the horizontal direction H-H. In this manner, the light irradiation angle of the luminous intensity distribution of light exiting in the vertical direction V-V becomes narrower than the light irradiation angle of the luminous intensity distribution of light exiting in the horizontal direction H-H. In other words, it is possible to achieve light distribution characteristics having a luminous intensity distribution that is asymmetric in the horizontal direction H-H and the vertical direction V-V.

The light exit surface of the lens portion 52*k* can be a convex curved surface or can be a concave curved surface. However, as shown in FIG. 8B and FIG. 8C, in the case of the light exit surface of the lens portion 52*k* being a convex curved surface, accumulation of water droplets, dust, or the like can be suppressed. Moreover, in the case of a convex curved surface, optical design becomes easy.

The luminous intensity distribution of light exiting from the lens portion 52*k* in the vertical direction V-V and the luminous intensity distribution of light exiting from the lens portion 52*k* in the horizontal direction H-H can be controlled by the length of the diagonal line 52*ka* and the length of the diagonal line 52*kb*, and the radius of curvature of the light exit surface of the lens portion 52*k*.

The length of the diagonal line 52*ka*, the length of the diagonal line 52*kb*, and the radius of curvature of the light exit surface of the lens portion 52*k* can be appropriately set according to the required luminous intensity distribution. For example, these may be appropriately set by performing experiments or simulations.

As shown in FIG. 5, light L1 emitted from the light emitting element 22 and incident on the incident surface 52*a* exits from the exit surface 52*e* to the outside of the optical portion 50. In this case, the light L1 is emitted to the vicinity of the central axis 1*a* of the vehicle lighting device 1.

A part of the light (light L2) emitted from the light emitting element 22 and incident on the incident surface 52*b* is reflected at the reflection surface 52*c* and exits from the exit surface 52*f* to the outside of the optical portion 50. In this case, the light L2 is mainly emitted to the outer side of the region to which the light L1 is emitted.

A part of the light (light L3) emitted from the light emitting element 22 and incident on the incident surface 52*b* is reflected at the reflection surface 52*d* and exits from the exit surface 52*g* to the outside of the optical portion 50. In this case, the light L3 is mainly emitted to the outer side of the region to which the light L2 is emitted.

In other words, the incident surface 52*a*, the incident surface 52*b*, the reflection surface 52*c*, and the reflection surface 52*d* distribute the light emitted from the light emitting element 22 toward the exit surface 52*e*, the exit surface 52*f*, and the exit surface 52*g*. Therefore, the luminous intensity distribution of the light incident on the exit surface 52*e*, the exit surface 52*f*, and the exit surface 52*g* can be adjusted, for example, by changing the dimensions of the incident surface 52*a*, and the inclination angles of the incident surface 52*b*, the reflection surface 52*c*, and the reflection surface 52*d*.

Although the above illustrates a case where the luminous intensity distribution of light exiting in the vertical direction V-V and the luminous intensity distribution of light exiting in the horizontal direction H-H are controlled by the substantially rhombic lens portion 52*k*, as shown in FIG. 2, multiple lens portions 52*k*1 having shapes different from the lens portion 52*k* can be further provided on the light exit surface of the optical element 52. For example, the shape of the lens portion 52*k*1 as viewed from the direction along the central axis 50*a* of the optical portion 50 can be substantially square or substantially rectangular. In this case, for example, one side of the lens portion 52*k*1 can be parallel to the vertical direction V-V. For example, the other side of the lens portion 52*k*1 can be parallel to the horizontal direction H-H.

The lens portion 52*k*1 having such a shape has a small difference between the luminous intensity distribution of light exiting in the vertical direction V-V and the luminous intensity distribution of light exiting in the horizontal direction H-H, making it possible to adjust the control of the luminous intensity distribution based on the substantially rhombic lens portion 52*k*.

In this case, as shown in FIG. 2, multiple lens portions 52*k* can be arranged side by side in the regions (exit surface 52*e*, exit surface 52*f*) on the central side of the light exit surfaces (exit surface 52*e*, exit surface 52*f*, exit surface 52*g*) of the optical element 52.

In the region (exit surface 52*g*) on the peripheral side of the light exit surface of the optical element 52, multiple lens portions 52*k*1 can be arranged side by side in the region of the horizontal direction H-H, and multiple lens portions 52*k* can be arranged side by side in the region of the vertical direction V-V.

The luminous intensity distribution of light exiting from the lens portion 52*k*1 in the vertical direction V-V and the luminous intensity distribution of light exiting from the lens portion 52*k*1 in the horizontal direction H-H can be controlled by the dimensions of the diagonal lines and radius of curvature, similar to the case of the lens portion 52*k* described above.

Additionally, in the case of the optical element 52 illustrated in FIG. 5, the recess 52*i* and the recess 52*j* are provided, but at least one of the recess 52*i* and the recess 52*j* can be omitted. For example, in the direction orthogonal to the central axis 50*a* of the optical portion 50, the exit surface 52*e*, the exit surface 52*f*, and the exit surface 52*g* may be continuous.

Furthermore, the incident surface 52*a* may be provided at the end of the optical element 52 on the light emitting element 22 side.

However, in the case where at least one of the recess 52*i* and the recess 52*j* is provided, weight reduction of the optical element 52 and reduction of material costs can be achieved. Also, as can be understood from FIG. 5, in the case where at least one of the recess 52*i* and the recess 52*j* is provided, an increase in wall thickness difference can be suppressed. Therefore, when molding the optical portion 50 by molding methods such as injection molding, two-color molding, and insert molding, occurrence of defects such as sink marks can be suppressed.

Here, as described above, the light L1 incident on the incident surface 52*a* is emitted to the vicinity of the central axis 1*a* of the vehicle lighting device 1 via the exit surface 52*e*. Therefore, control of the luminous intensity distribution according to the incident surface 52*a* and the exit surface 52*e* becomes most important for controlling the light distribution characteristics of the vehicle lighting device 1.

In this case, as described above, the light L1 incident on the incident surface 52*a* is emitted to the vicinity of the central axis 1*a* of the vehicle lighting device 1 via the exit surface 52*e*. The light emitting element 22 such as a light emitting diode has the highest intensity of light emission in the optical axis direction, like Lambertian light distribution. Therefore, light control in the vicinity of the central axis 1*a* (optical axis) according to the incident surface 52*a* and the exit surface 52*e* becomes most important for controlling the light distribution characteristics of the vehicle lighting device 1.

As described above, multiple lens portions 52*k* are provided on the exit surface 52*e*, and the luminous intensity distribution of light exiting from the exit surface 52*e*, and consequently the light distribution characteristics of the vehicle lighting device 1, are controlled by the dimensions of the lens portions 52*k* and the radius of curvature of the light exit surfaces of the lens portions 52*k*.

In this case, if the light incident on the incident surface 52*a* and propagating inside the optical element 52 becomes parallel light, the parallel light can be incident on the exit surface 52*e*. In the case of the light incident on the exit surface 52*e* being parallel light, optical design at the exit surface 52*e* (for example, design of the dimensions of the lens portions 52*k*, and design of the radius of curvature of the light exit surfaces of the lens portions 52*k*) becomes easy.

Therefore, the convex curved surface of the incident surface 52*a* is a paraboloid of revolution or a hyperboloid of revolution.

Figure 9A:
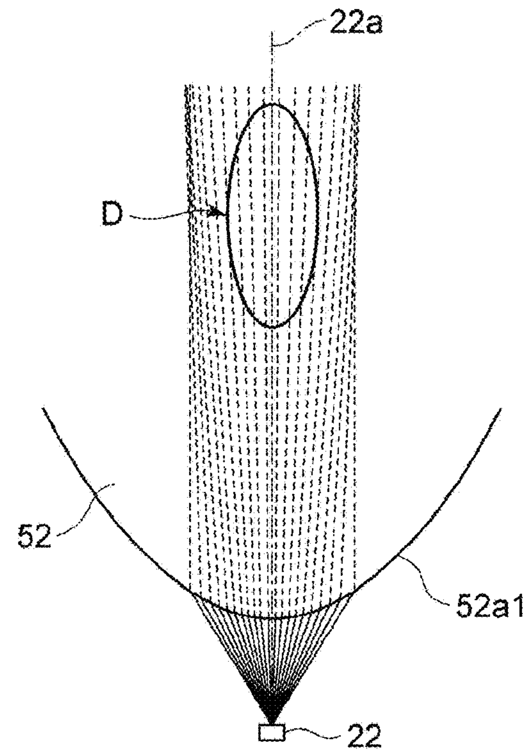
FIG. 9A and FIG. 9B are schematic diagrams for illustrating the relationship between the shape of the incident surface and the form of light propagating inside the optical element.
Figure 9B:
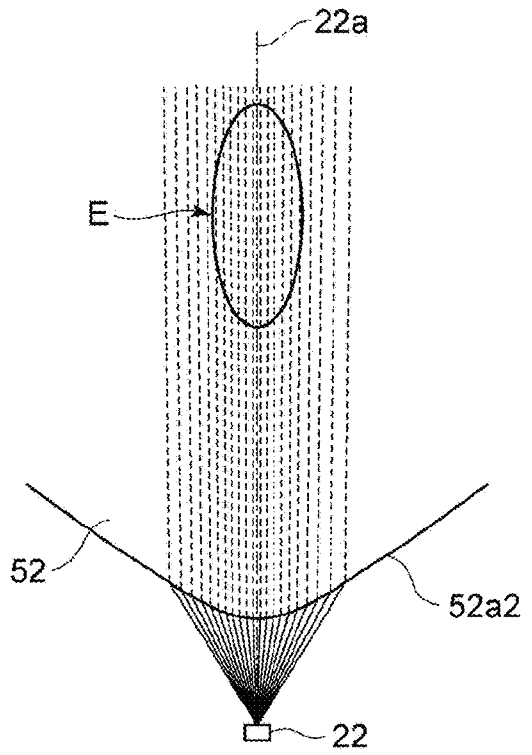

FIG. 9A and FIG. 9B are schematic diagrams for illustrating the relationship between the shape of the incident surface and the form of light propagating inside the optical element 52.

FIG. 9A shows a case where the shape of the incident surface 52*a*1 is a paraboloid of revolution.

FIG. 9B shows a case where the shape of the incident surface 52*a*2 is a hyperboloid of revolution.

As can be understood from FIG. 9A, in the case of making the shape of the incident surface 52*a*1 a paraboloid of revolution, the light propagating inside the optical element 52 can be made to approach parallel light.

As can be understood from FIG. 9B, even in the case of making the shape of the incident surface 52*a*2 a hyperboloid of revolution, the light propagating inside the optical element 52 can be made to approach parallel light.

However, as clear from the comparison between portion D in FIG. 9A and portion E in FIG. 9B, in the case of making the shape of the incident surface 52*a*2 a hyperboloid of revolution, the light propagating inside the optical element 52 can be made to approach parallel light more closely than in the case of making the shape of the incident surface 52*a*1 a paraboloid of revolution.

Therefore, it is more preferable to make the shape of the incident surface 52*a*2 a hyperboloid of revolution.

A hyperboloid of revolution, which is one type of quadric surface of revolution, can be expressed by the following formula.

$$z = \frac{cr^2}{1 + \sqrt{1 - (1 + k)c^2r^2}}$$ [Formula 1]

r is the distance (mm) between the incident surface 52*a*2 and the optical axis 22*a* in a direction orthogonal to the optical axis 22*a* of the light emitting element 22.

c is the curvature of the incident surface 52*a*2.

k is the conic constant.

In the case of a hyperboloid of revolution, the conic constant is "k<−1".

In this case, according to the knowledge obtained by the inventors, it is preferable to set the curvature to 0.3 or more and 1 or less, and set the conic constant to −4 or more and less than −1. In this manner, the light propagating inside the optical element 52 can be made to approach parallel light, and the light from the light emitting element can be efficiently incident in the region facing the exit surface 52*e*.

As described above, the light emitting module 20 has multiple light emitting elements 22 at rotationally symmetric positions on a circumference centered on the central axis 1*a* of the vehicle lighting device 1, making it possible to obtain light distribution characteristics having a luminous intensity distribution (symmetric luminous intensity distribution) in which the light irradiation angles of the luminous intensity distribution are substantially the same in the horizontal direction H-H and the vertical direction V-V. Therefore, the versatility of the light emitting module 20 can be improved.

Moreover, the optical element 52 has light distribution characteristics having a luminous intensity distribution (asymmetric luminous intensity distribution) in which the light irradiation angles of the luminous intensity distribution differ in the horizontal direction H-H and the vertical direction V-V (for example, light distribution characteristics in which the light irradiation angle of the luminous intensity distribution in the horizontal direction H-H is wider than the light irradiation angle of the luminous intensity distribution in the vertical direction V-V).

In addition, since the shape of the incident surface 52*a* of the optical element 52 is a paraboloid of revolution or a hyperboloid of revolution, light propagating inside the optical element 52 can be made to approach parallel light. Therefore, optical design at the exit surface 52*e* becomes easy, and it becomes easy to obtain desired light distribution characteristics.

In other words, the vehicle lighting device 1 according to this embodiment makes it possible to maintain the versatility of the light emitting module 20, and obtain light distribution characteristics having a luminous intensity distribution that is asymmetric in the horizontal direction and the vertical direction.

(Vehicle Lamp)

In one embodiment of the disclosure, a vehicle lamp 100 including the vehicle lighting device 1 can be provided. The above description regarding the vehicle lighting device 1, and modification examples of the vehicle lighting device 1 (modification examples in which those skilled in the art appropriately add, delete, or make design changes to components and which have the features of the disclosure) can all be applied to the vehicle lamp 100.

The following illustrates a case where the vehicle lamp 100 is a rear combination light provided in an automobile as an example. However, the vehicle lamp 100 is not limited to a rear combination light provided in an automobile. The vehicle lamp 100 may be any vehicle lamp provided in automobiles, railway vehicles, and the like.

Figure 10:
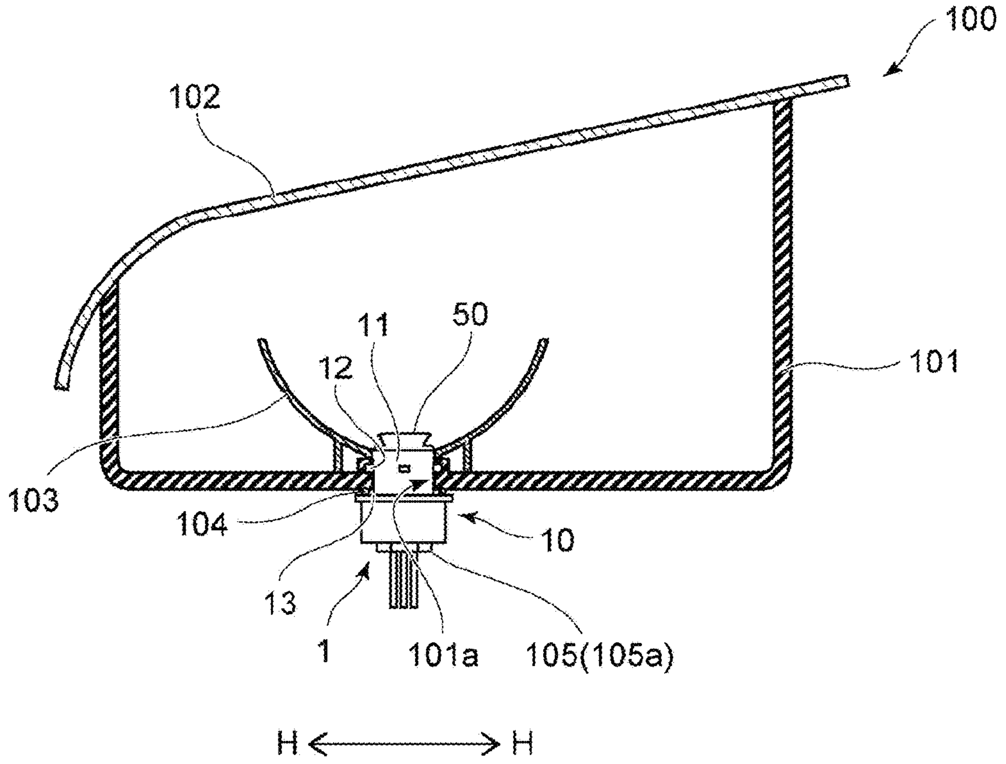
FIG. 10 is a schematic partial cross-sectional view for illustrating the vehicle lamp.

FIG. 10 is a schematic partial cross-sectional view for illustrating the vehicle lamp 100.

As shown in FIG. 10, the vehicle lamp 100 includes, for example, the vehicle lighting device 1, a housing 101, a cover 102, an optical element 103, a sealing member 104, and a connector 105.

The vehicle lighting device 1 is attached to the housing 101. The housing 101 holds the mounting portion 11. The housing 101 presents a box shape with one end side open. The housing 101 is made of, for example, a resin that does not transmit light, or the like. On the bottom surface of the housing 101, an attaching hole 101*a* is provided into which the portion of the mounting portion 11 where the bayonet 12 is provided is inserted. On the periphery of the attaching hole 101*a*, a recess is provided into which the bayonet 12 provided on the mounting portion 11 is inserted. Although it is illustrated that the attaching hole 101*a* is directly provided in the housing 101, an attaching member having the attaching hole 101*a* may be provided in the housing 101.

When attaching the vehicle lighting device 1 to the vehicle lamp 100, the portion of the mounting portion 11 where the bayonet 12 is provided is inserted into the attaching hole 101*a*, and the vehicle lighting device 1 is rotated. Then, for example, the bayonet 12 is held by a fitting portion provided on the periphery of the attaching hole 101*a*. Such an attaching method is called a twist lock.

The cover 102 is provided to close the opening of the housing 101. The cover 102 is made of a translucent resin or the like. The cover 102 can also have functions of a lens or the like.

Light exiting from the vehicle lighting device 1 (optical portion 50) is incident on the optical element 103. The optical element 103 performs reflection, diffusion, light guiding, light collection, formation of a predetermined light distribution pattern, etc. on the light exiting from the vehicle lighting device 1 (optical portion 50). For example, the optical element 103 illustrated in FIG. 10 is a reflector. In this case, the optical element 103 reflects the light exiting from the vehicle lighting device 1 (optical portion 50) to form a predetermined light distribution pattern.

The sealing member 104 is provided between the flange 13 and the housing 101. The sealing member 104 presents an annular shape and is made of an elastic material such as rubber or silicone resin.

When attaching the vehicle lighting device 1 to the vehicle lamp 100, the sealing member 104 is sandwiched between the flange 13 and the housing 101. Therefore, the sealing member 104 can seal the internal space of the housing 101. Also, the elastic force of the sealing member 104 presses the bayonet 12 against the housing 101. Therefore, it is possible to suppress the vehicle lighting device 1 from detaching from the housing 101.

The connector 105 is fitted to the ends of multiple power supply terminals 31 exposed inside the connector holder 15. A lighting circuit or the like provided outside the vehicle lamp 100 is electrically connected to the connector 105. Therefore, the lighting circuit or the like and the light emitting element 22 can be electrically connected by fitting the connector 105 to the ends of the multiple power supply terminals 31.

In addition, the connector 105 is provided with a sealing member 105*a*. When inserting the connector 105 having the sealing member 105*a* into the connector holder 15, the inside of the connector holder 15 is sealed to be watertight.

Although several embodiments of the disclosure have been illustrated above, these embodiments are presented as examples and are not intended to limit the scope of the disclosure. These novel embodiments can be implemented in various other forms, and various omissions, substitutions, and changes can be made without departing from the gist of the disclosure. These embodiments and modification examples thereof are included in the scope and gist of the disclosure, and are included in the disclosure defined by the claims and the equivalent scope thereof. The respective embodiments described above can also be implemented in combination with each other.

The following shows supplementary notes regarding the aforementioned embodiments.

Supplementary Note 1

A vehicle lighting device, including:
a socket;
a light emitting module provided on one end side of the socket and including at least one light emitting element; and
an optical element provided on the one end side of the socket and facing the light emitting element,
in which the optical element has:
at least one incident surface having a convex curved surface protruding toward a light emitting element side; and
an exit surface facing the incident surface and provided with a plurality of lens portions arranged side by side,
the convex curved surface is a paraboloid of revolution or a hyperboloid of revolution, and
a luminous intensity distribution in a first direction, orthogonal to a central axis of the vehicle lighting device, of light exiting from the exit surface differs from a luminous intensity distribution in a second direction orthogonal to the central axis and the first direction.

Supplementary Note 2

The vehicle lighting device according to Supplementary Note 1, in which a shape of each of the plurality of lens portions as viewed from a direction along the central axis is substantially rhombic, and
a length of a diagonal line of the lens portion in the first direction is longer than a length of a diagonal line of the lens portion in the second direction.

Supplementary Note 3

The vehicle lighting device according to Supplementary Note 1 or 2, in which an exit surface of light of the lens portion is a convex curved surface or a concave curved surface.

Supplementary Note 4

The vehicle lighting device according to any one of Supplementary Notes 1 to 3, in which the light emitting module includes a plurality of the light emitting elements provided at rotationally symmetric positions on a circumference centered on the central axis,
the optical element has a plurality of the incident surfaces,
each of the plurality of incident surfaces faces one of the light emitting elements, and
a vertex of the incident surface overlaps with a center of an exit surface of light of the light emitting element, as viewed from a direction along the central axis.

Supplementary Note 5

A vehicle lamp, including:
the vehicle lighting device according to any one of Supplementary Notes 1 to 4; and
a housing to which the vehicle lighting device is attached,
in which the first direction is a vertical direction, and
the second direction is a horizontal direction.

What is claimed is:

1. A vehicle lighting device, comprising:
a socket;
a light emitting module provided on one end side of the socket and comprising at least one light emitting element; and
an optical element provided on the one end side of the socket and facing the light emitting element,
wherein the optical element has:

at least one incident surface having a convex curved surface protruding toward a light emitting element side;

a first exit surface provided at an end portion of the optical element, the end portion being on a side opposite to the light emitting element side;

a second exit surface provided on a bottom surface side of a first recess, the first recess being provided on the light emitting element side of the first exit surface; and a third exit surface provided on a bottom surface side of a second recess, the second recess being provided on the light emitting element side of the second exit surface, wherein the third exit surface faces the incident surface and is provided with a plurality of lens portions arranged side by side, the convex curved surface is a paraboloid of revolution or a hyperboloid of revolution, and a luminous intensity distribution in a first direction, orthogonal to a central axis of the vehicle lighting device, of light exiting from the exit surface differs from a luminous intensity distribution in a second direction orthogonal to the central axis and the first direction.

2. The vehicle lighting device according to claim 1, wherein a shape of each of the plurality of lens portions as viewed from a direction along the central axis is substantially rhombic, and a length of a diagonal line of the lens portion in the first direction is longer than a length of a diagonal line of the lens portion in the second direction.

3. The vehicle lighting device according to claim 1, wherein an exit surface of light of the lens portion is a convex curved surface or a concave curved surface.

4. The vehicle lighting device according to claim 1, wherein the light emitting module comprises a plurality of the light emitting elements provided at rotationally symmetric positions on a circumference centered on the central axis, the optical element has a plurality of the incident surfaces, each of the plurality of incident surfaces faces one of the light emitting elements, and a vertex of the incident surface overlaps with a center of an exit surface of light of the light emitting element, as viewed from a direction along the central axis.

5. A vehicle lamp, comprising:

the vehicle lighting device according to claim 1; and a housing to which the vehicle lighting device is attached, wherein the first direction is a vertical direction, and the second direction is a horizontal direction.

* * * * *